(12) United States Patent
Rambosek (10) Patent No.: US 6,299,088 B1
(45) Date of Patent: Oct. 9, 2001

(54) MEMORY CHIP RETAINER FOR A DATA STORAGE CARTRIDGE

(75) Inventor: G. Phillip Rambosek, Shafer, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/475,613

(22) Filed: Dec. 30, 1999

(51) Int. Cl.[7] .................................................. G03B 23/02
(52) U.S. Cl. .............................................. 242/347; 360/132
(58) Field of Search .................................... 242/347, 344, 242/357; 360/132

(56) References Cited

U.S. PATENT DOCUMENTS

| | | | |
|---|---|---|---|
| 5,434,721 | * | 7/1995 | Sawada et al. ........................ 360/132 |
| 5,541,796 | * | 7/1996 | Sawada ................................. 360/132 |
| 5,784,227 | * | 7/1998 | Kitamura et al. ..................... 360/132 |
| 5,791,578 | * | 8/1998 | Kurokawa et al. ................... 242/344 |
| 5,847,898 | * | 12/1998 | Suzuki et al. ........................ 360/132 |
| 6,005,754 | * | 12/1999 | Ohgi ..................................... 360/132 |
| 6,160,679 | * | 12/2000 | Maekawa et al. .................... 242/347 |

FOREIGN PATENT DOCUMENTS 0 924 701 A2    6/1999    (EP) .

* cited by examiner

*Primary Examiner*—Emmanuel M. Marcelo
(74) *Attorney, Agent, or Firm*—Eric D. Levinson (57) ABSTRACT

A data storage cartridge (10) includes a housing (12) having a first section (13) operatively connected to a second section (14). A chip retaining section (30) includes a forward stop (33), first lateral stop (34), second lateral stop (35) and a rear-positioning member (31) having an angled support surface (32). A memory chip (50) is positioned on the rear-positioning member (31). A chip retaining post (40) extends toward the memory chip (50) wherein the chip (50) is positioned laterally by the lateral stops and the post maintains the memory chip (50) in position on the rear-positioning member (31).

15 Claims, 7 Drawing Sheets

MEMORY CHIP RETAINER FOR A DATA STORAGE CARTRIDGE

BACKGROUND OF THE INVENTION

This invention relates generally to a data storage tape cartridge and more particularly to a data storage tape cartridge having a memory chip retainer.

Cartridges have been used for decades in the computer, audio, and video fields. The data storage tape cartridge continues to be an extremely popular form of recording large volumes of information for subsequent retrieval and use. One improvement that has been made to the data tape cartridges is the use of a memory chip that is positioned within the cartridge. The memory chip includes suitable information such as the manufacturing date of the cartridge, how many times the cartridge has been run, a cartridge I.D. number, the cartridge contents or any other type of suitable information. The information on the memory chip is read by a reader, such as an LT-Reader. Such use of a memory chip and a reader is well known in the art.

The memory chip is placed inside of the cartridge without the need to physically connect the memory chip to wires in order to read or write the information. It is simply read by the reader when the reader is in close proximity to the chip. However, it is important to retain the memory chip in position so that it may easily and properly be read by the reader. It is therefore desirable to secure the memory chip in position so that it does not rattle, become loose or damaged as the cartridge is being handled and still maintain its proper orientation.

Data storage tape cartridges are important tools to maintain vast amounts of information. To remain competitive, data storage tape cartridge manufacturers must continually improve cartridge performance and reliability while reducing manufacturing costs. Therefore, the need exists to manufacture a data storage cartridge which effectively and at a low cost maintains a memory chip in position.

SUMMARY OF THE INVENTION

In one embodiment, the invention is a data storage cartridge which has a housing. The housing has a first section and a second section which is operatively connected to form the housing. A chip retaining segment is in one of the sections. The segment includes a forward stop and a rear-positioning member having a supporting portion. A memory chip is positioned on the supporting portion. A chip retaining post is operatively connected to the other of the sections and extends toward the memory chip, wherein pressure from the post on the memory chip maintains the memory chip in position on the rear-positioning member.

In another embodiment, the invention is a data storage cartridge having a housing with first and second sections operatively connected to form the housing. A chip retaining segment is in one of the sections and includes first and second lateral stops, a forward stop and a rear-positioning member having a supporting portion. A memory chip is positioned on the rear-positioning member and a chip retaining post is operatively connected to the other of the sections and extends toward the memory chip, wherein the chip is positioned laterally by the lateral stops and the post maintains the memory chip in position on the rear-positioning member.

DETAILED DESCRIPTION OF THE PREFERRED EMBODIMENT

Referring to the drawings, wherein like numerals like parts throughout the several views, there is generally disclosed at 10 a data storage tape cartridge. Generally speaking, the data storage tape cartridge 10 includes a housing 12 having a first section 13 and a second section 14. A tape reel assembly is utilized to house the storage tape (not shown). The storage tape is wound around the tape reel assembly 15.

The housing 12 is preferably sized to receive a typical tape drive (not shown). Thus, the housing 12 may be sized for use within a 5.25 inch (130 millimeter) form factor drive or a 3.5 inch (90 millimeter) form factor drive, or other useful sizes. In one preferred embodiment, the first section 13 forms a cover whereas the second section 14 serves as a base. It should be understood that the directional terminology, such as "cover", "base", "upper", "lower", "top", "bottom", etc. are used for purposes of illustration only, and are in no way limiting.

Figure 1:
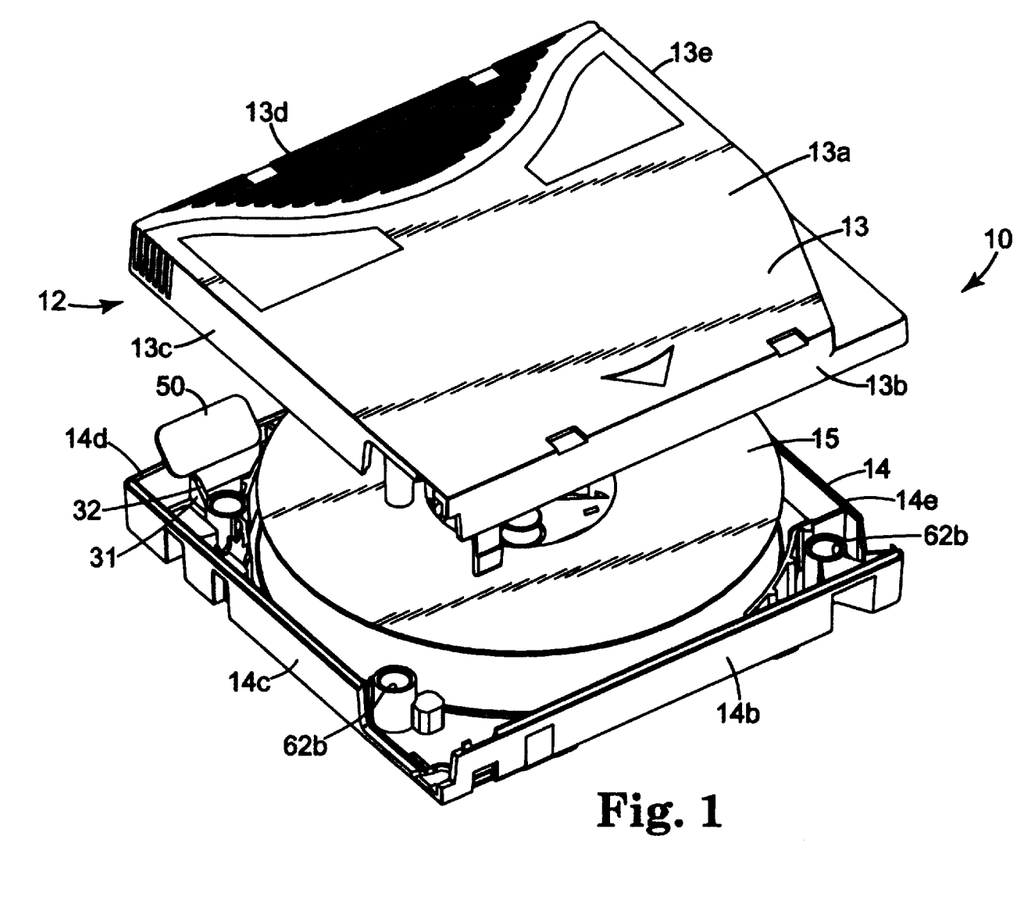
FIG. 1 is an exploded perspective view of a data storage tape cartridge in accordance with the present invention viewed generally from above.
Figure 6:
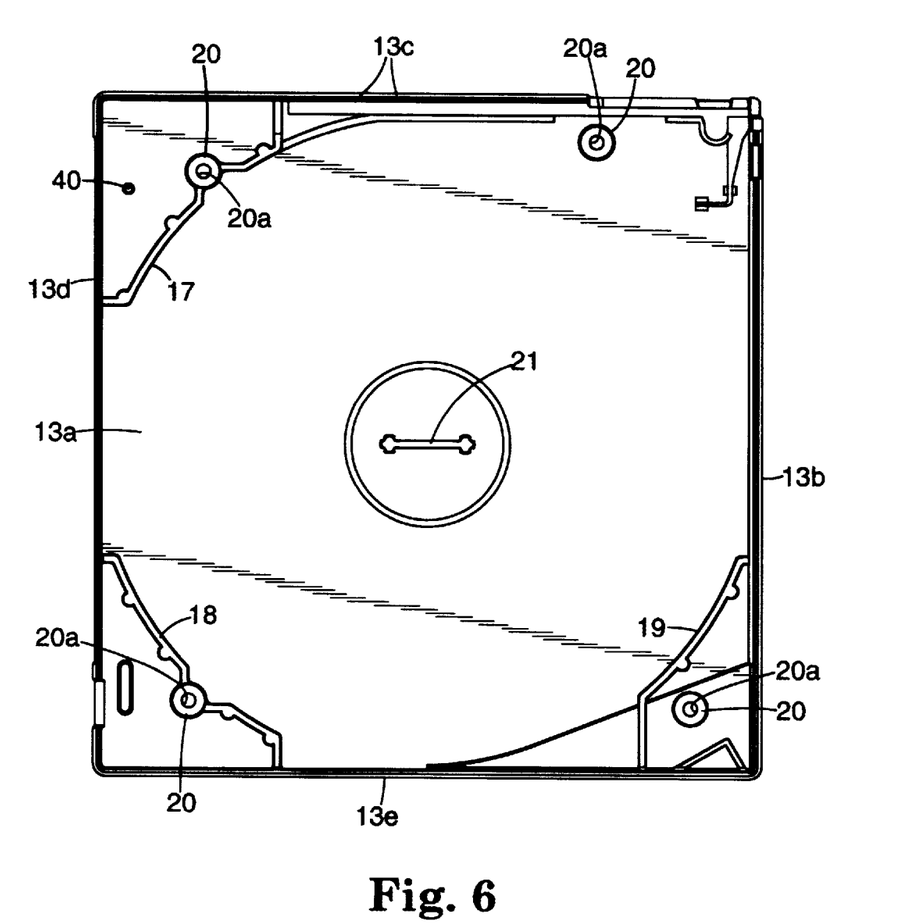
FIG. 6 is a plan view of the first section of the housing of the data storage tape cartridge shown in FIG. 1.

The first section 13 has a planar member 13a which four sidewalls 13b–13e which depend generally at a 90 degree angle from the planar member 13a. Arcuate inner walls 17–19 are formed which define a cavity for the tape reel assembly 15. Four cylinders 20 extend from the planer member 13a. The cylinders 20 have openings 20a at one end. The cylinders are hollow to receive a screw, as will be discussed more fully hereafter. An elongate brake post 21 extends upward from the planar member 13a. The brake post engages a brake button (not shown) which in turn engages the tape reel assembly 15.

Figure 2:
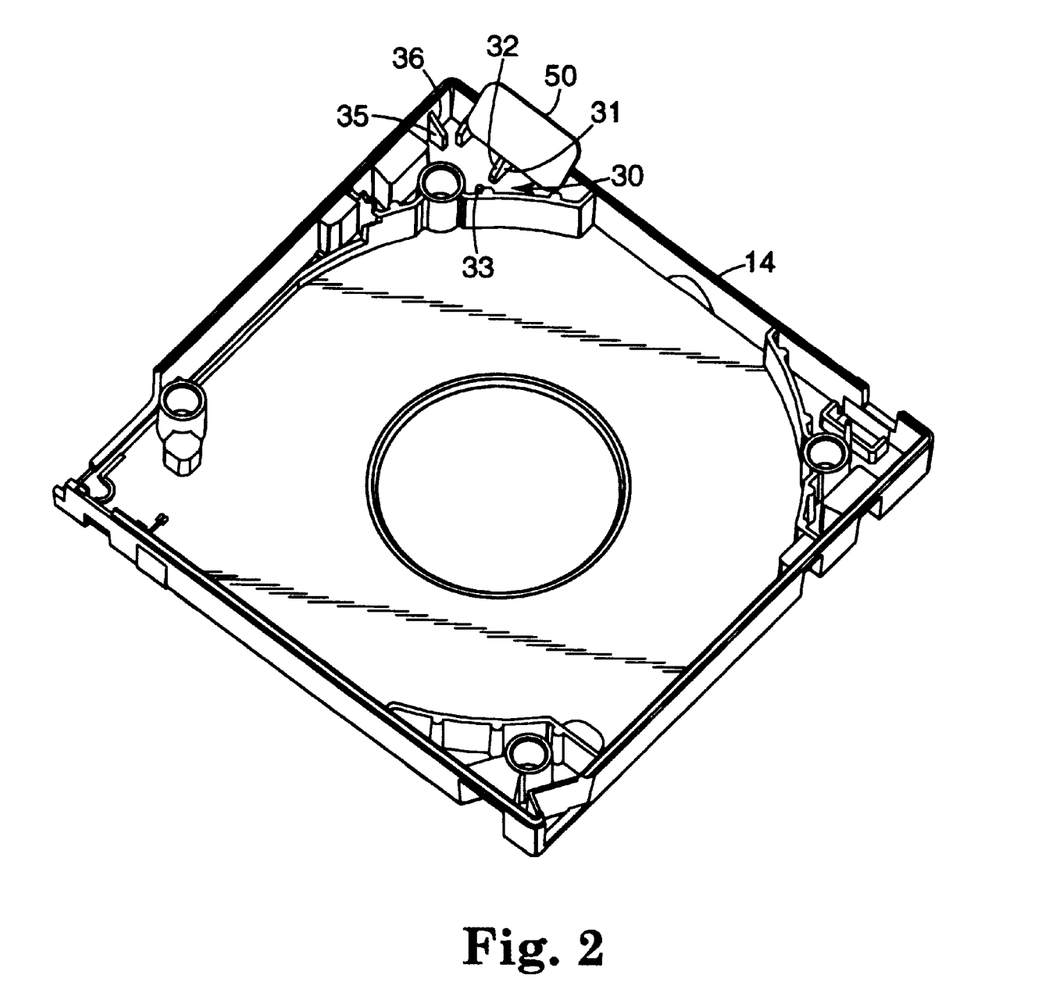
FIG. 2 is a perspective view of a second section of the housing of the data storage tape cartridge shown in FIG. 1.
Figure 3:
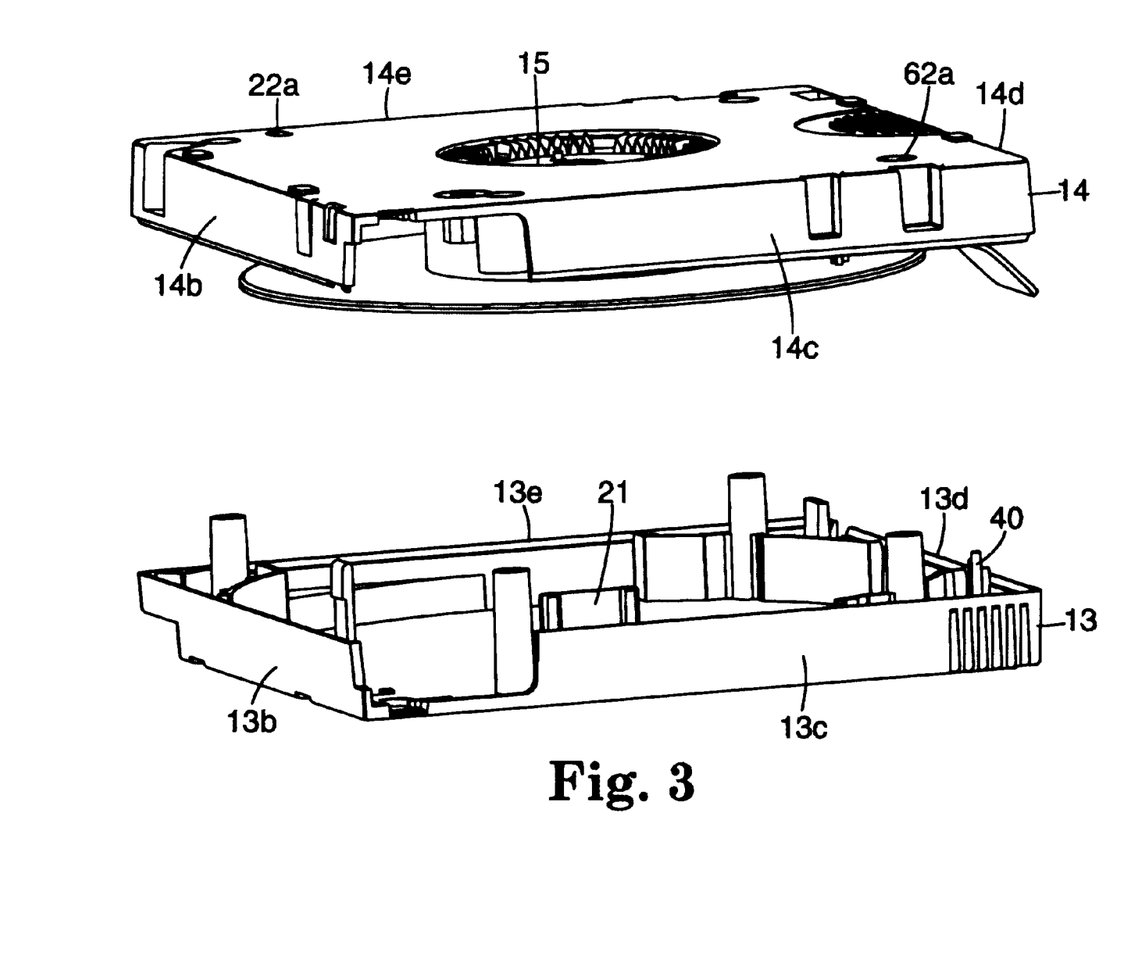
FIG. 3 is another view of an exploded perspective view of the data storage cartridge, viewed generally from below.
Figure 4:
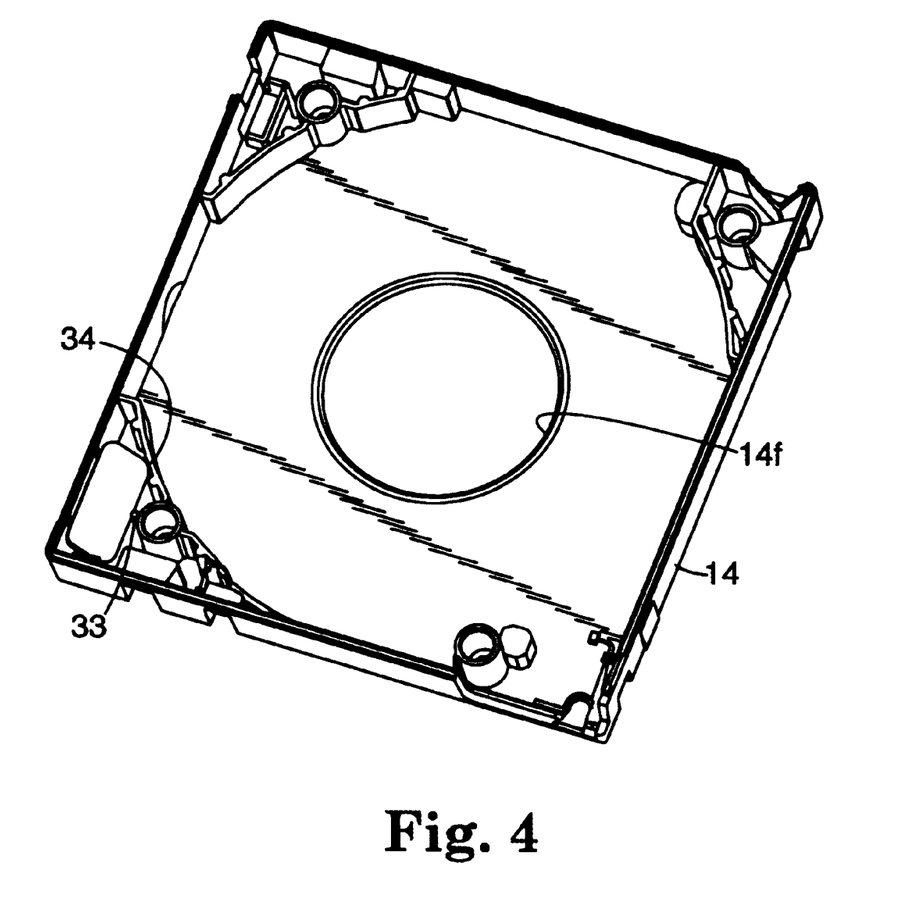
FIG. 4 is a partial perspective view of the section shown in FIG. 2 with the memory chip in position.
Figure 7:
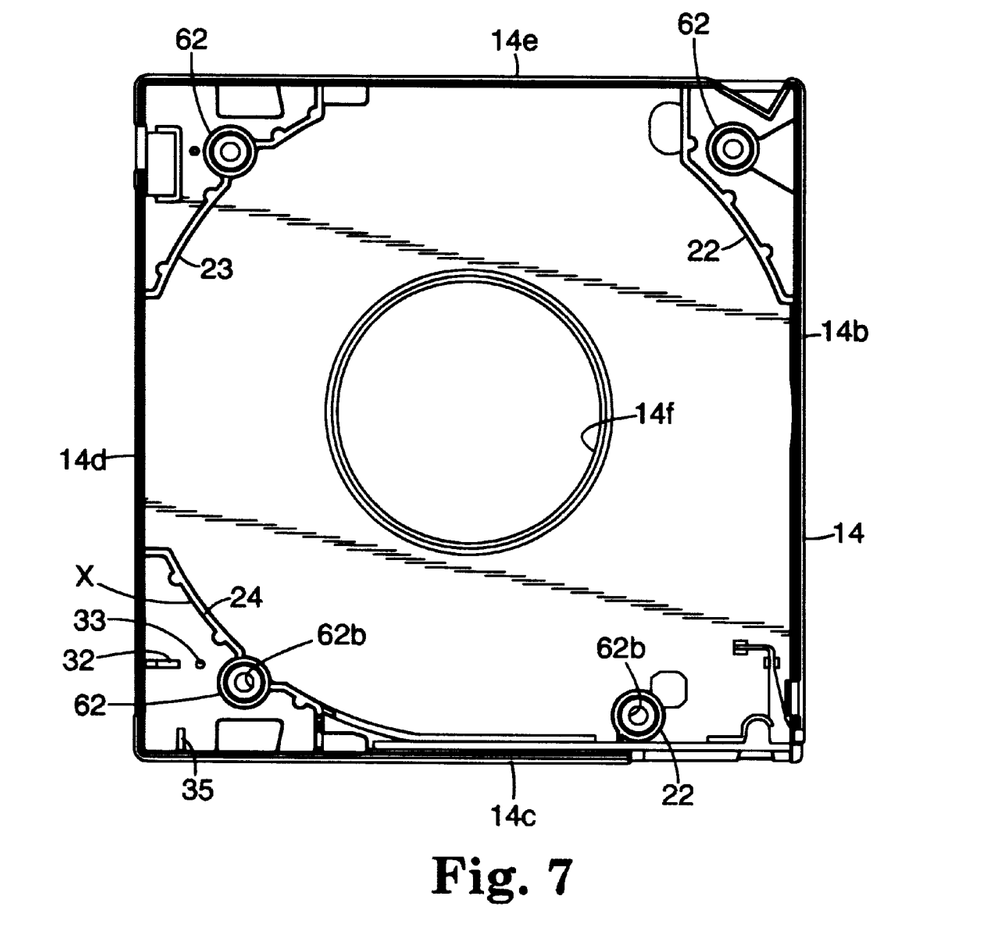
FIG. 7 is a plan view of the second section of the housing of the data storage tape cartridge shown in FIG. 1.

The second section 14 has a planar member 14a and four sidewalls 14b–14e which depend generally at a 90 degree angle from the planar member 14a. An aperture 14f is formed in the planar member 14a and provides access for a tape drive (not shown) to the tape reel assembly 15. There are three arcuate inner sidewalls 22–24 which, along with the sidewalls 17–19 from the first section 13, form the cavity for the tape reel assembly 15. Four cylindrical posts 62 extend upward from the planar member 14a. The cylindrical posts 62 have openings 62a at one end and openings 62b at their other ends. The cylinders 20 are sized and configured to fit inside of the cylindrical posts 62. Then, when assembled, screws (not shown) are inserted in the openings 62a and tightened to secure the two sections together to form the housing 12. Preferably, the sections 13 and 14 are each formed as separate integral moldings from a suitable material such as polycarbonate. The data storage cartridge described thus far is a typical data storage cartridge, the construction of which is well known in the art. It is appreciated that the memory chip retainer to be described hereafter may be utilized with the data storage tape cartridge described thus far or with other suitable data storage tape cartridges which require a memory chip.

The memory chip retainer includes a chip retaining section 30 in one of the sections and a chip retaining post 40 in the other section. While the chip retaining section 30 is in the second section 14 and the chip retaining post 40 is in the first section 13, it is appreciated that this could be reversed. The memory chip 50 is well known in the art and is generally a thin rectangular chip. The chip 50 is approximately 2 centimeters by 1 centimeter and has a thickness of approximately 2 millimeters, although it is understood the other sized memory chips may also be utilized. The chip 50 may be read by any well known readers such as an LT-Reader, also which is well known in the art.

The chip retaining section 30 is operatively connected to the second section 14. In a preferred embodiment, it is integral with section 14 and is formed in the same molding process. A rear-positioning member 31 is operatively connected to the planar member 14a and also the sidewall 14d. The rear-positioning member 31 has an angled surface 32 on which the memory chip 50 rests. A forward stop 33 is connected to the planar member 14a. The forward stop 33 is a circular post, but it is appreciated that other configurations may also be utilized. The forward stop 33 retains the memory chip 50 from sliding further down the angled surface 32 before the retaining post 40 is in position. A first lateral stop 34 is formed by the outer wall 24 at approximately position X as shown in FIG. 7. The second lateral stop 35 is operatively connected to the planar member 14a and the sidewall 14c. The stop 35 has a downwardly depending top surface 36 which forms an angled surface to help guide the memory chip 50 down into position, as will be described more fully hereafter. The distance between the lateral stops 34 and 35 is slightly larger than the length of the memory chip. This provides for a tolerance fit and allows for the memory chip 50 to easily be dropped in position between the two lateral stops 34 and 35.

Figure 5:
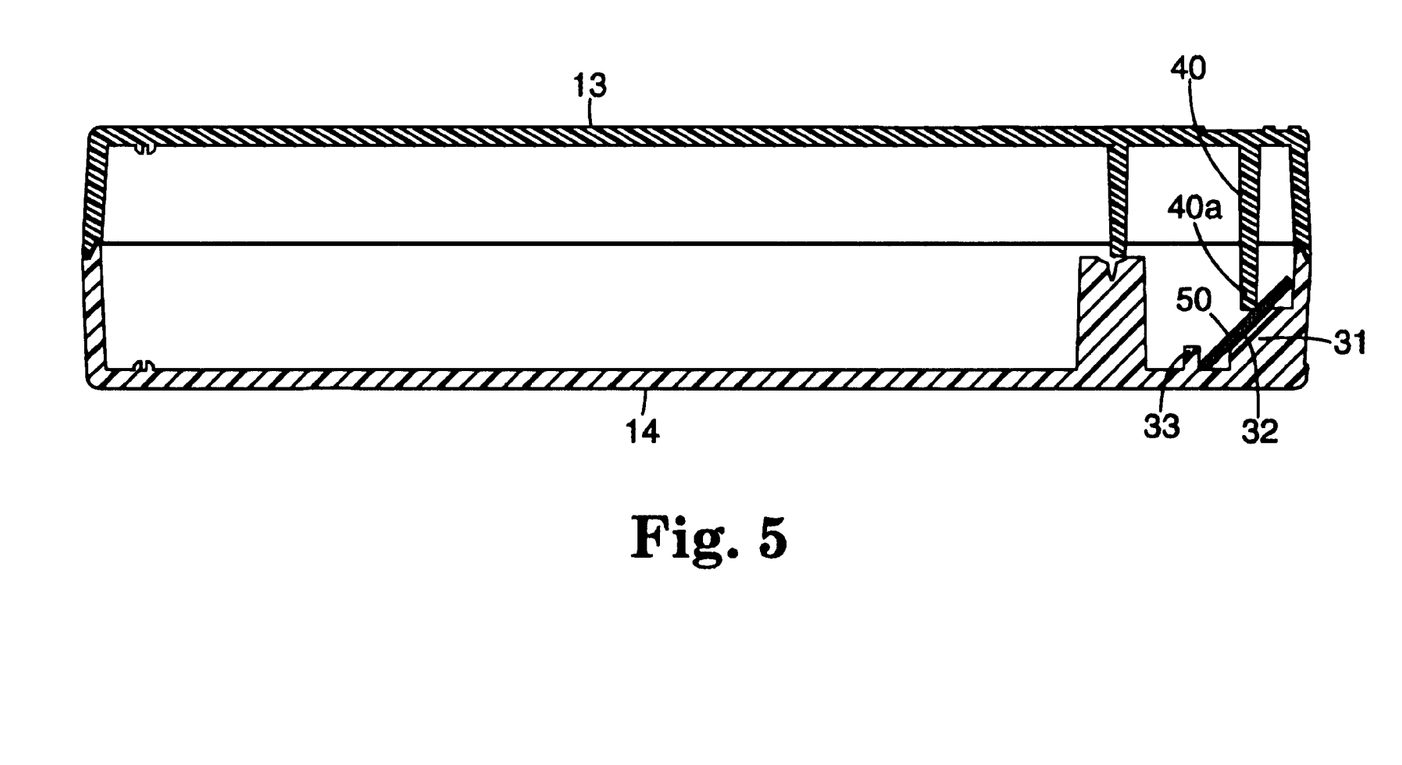
FIG. 5 is a cross-sectional view of the data storage cartridge shown in FIG. 1.

The chip retaining post 40 has its first end operatively connected to the planar member 13a and extends generally upward therefrom. In a preferred embodiment, the post 40 is integral with the section 13 and is formed in the same molding process. The post 40 is shown as circular, but it is understood that other suitable configurations may be utilized. As shown, the post 40 has a base of from 0.030 to 0.035 inches and tapers to a top diameter of from 0.020 to 0.025 inches. The post is made from a polycarbonate plastic and, with the dimensions thus described, has some flexibility. The top of the post 40 may have an angled top surface 40a such that it is generally parallel to the angled support surface 32. As best seen in FIG. 5, the chip retaining post 40 has a length which extends from the first section 13 to the memory chip 50 such that there is an interference fit and the post 40 will apply a pressure to the memory chip 50 to hold it in position against the angled support surface 32. It has been found that an interference fit of from about 0.005 inches to 0.010 inches is sufficient to form an interference fit by the flexible post 40 and apply suitable pressure to hold the chip 50 in position.

The memory chip 50 is of course inserted in the second section 14 before the first section 13 is connected to the second section 14. FIGS. 1 and 2 show the memory chip 50 exploded away from the chip retaining section 30. The memory chip 50, when in the position shown in FIGS. 1 and 2, is then lowered down on to the angled surface 32. The lateral stops 34 and 35 position the chip laterally. Further, the angled top surface 36 assists in the proper lateral positioning of the memory chip 50. As the memory chip 50 is lowered in position, the forward stop 33 brings the memory chip 50 to its final position and prevents further downward movement of the memory chip 50 down the angled surface 32. Then, the first section 13 is placed over the second section 14 and lowered into position. When aligned, the four screws (not shown) are inserted into the openings 62a and the two sections 13, 14 are operatively connected to form the housing 12. When operatively connected, the chip retaining post 40 forms an interference fit by applying pressure to the memory chip 50 on to the angled support surface 32. This holds the memory chip 50 in position. The chip retaining post 40 is positioned so that it is over the top of the angled surface 32, thereby providing the force for keeping the memory chip 50 in position. The chip retaining section 30 and chip retaining post 40 provide for an effective method of holding the memory chip 50 in position without any secondary operations to secure the chip 50. The chip 50 is automatically aligned and oriented and held in position for subsequent use in transferring the signal from the memory chip 50 to an LT-Reader.

The above specification, examples and data provide a complete description of the manufacture and use of the composition of the invention. Since many embodiments of the invention can be made without departing from the spirit and scope of the invention, the invention resides in the claims hereinafter appended.

I claim:
1. A data storage cartridge comprising:
 a) a housing having a first section and a second section, the sections operatively connected to form the housing;
 b) a chip retaining section in one of said sections, the section comprising:
  i) first and second lateral stops;
  ii) a forward stop; and
  iii) a rear-positioning member having a supporting portion;
 c) a memory chip positioned on the rear-positioning member; and
 d) a chip retaining flexible post operatively connected to the other of said sections and extending toward the memory chip, wherein the chip is positioned laterally by the lateral stops and the post maintains the memory chip in position on the rear-positioning member.

2. The data storage cartridge of claim 1, further comprising the rear-positioning member's supporting portion is an angled chip support surface.

3. The data storage cartridge of claim 2, wherein the post is in general alignment with the angled chip supporting surface.

4. The data storage cartridge of claim 1, wherein the post has an interference fit with the memory chip.

5. The data storage cartridge of claim 1, wherein one of the lateral stops has an angled top surface to assist in guiding the memory chip into position.

6. The data storage cartridge of claim 1, wherein the chip retaining member is made from polycarbonate.

7. The data storage cartridge of claim 6, wherein the chip retaining section is an integral portion of the one of said sections and the post is an integral portion of the other of said sections.

8. A data storage cartridge comprising:
 a) a housing having a first section and a second section, the sections operatively connected to form the housing;
 b) a chip retaining section in one of said sections, the section comprising:
  i) a forward stop;

ii) a rear-positioning member having a supporting portion; and iii) a second stop;

c) a memory chip positioned on the supporting portion; and d) a chip retaining flexible post operatively connected to the other of said sections and extending toward the memory chip, wherein pressure from the post on the memory chip maintains the memory chip in position on the rear-positioning member.

9. The data storage cartridge of claim 8, wherein the rear-positioning supporting portion is an angled chip support surface.

10. The data storage cartridge of claim 9, further comprising a first lateral stop.

11. The data storage cartridge of claim 10, wherein the post has an interference fit with the memory chip.

12. The data storage cartridge of claim 11, wherein one of the lateral stops has an angled top surface to assist in guiding the memory chip into position.

13. The data storage cartridge of claim 12, wherein the post is in general alignment with the angled chip supporting surface.

14. The data storage cartridge of claim 13, wherein the chip retaining member is made from polycarbonate.

15. The data storage cartridge of claim 14, wherein the chip retaining section is an integral portion of the one of said sections and the post is an integral portion of the other of said sections.

* * * * *